United States Patent [19]

Bourne

[11] 4,392,587
[45] Jul. 12, 1983

[54] APPLICATOR FOR GRANULAR MATERIAL

[76] Inventor: W. John Bourne, P.O. Box 1333, Kindersley, Saskatchewan, Canada, S0L-1S0

[21] Appl. No.: 193,074

[22] Filed: Oct. 2, 1980

Related U.S. Application Data

[63] Continuation of Ser. No. 876,252, Feb. 9, 1978, abandoned.

[30] Foreign Application Priority Data

Jan. 9, 1978 [CA] Canada .................................. 294541

[51] Int. Cl.³ ............................................ G01F 13/00
[52] U.S. Cl. ..................................... 222/63; 222/414; 222/626; 239/650; 239/656
[58] Field of Search ................... 222/23, 63, 403, 410, 222/414, 626, 330; 239/656, 677, 650, 677; 318/328; 324/158 MG, 166, 177

[56] References Cited

U.S. PATENT DOCUMENTS

| | | | |
|---|---|---|---|
| 266,805 | 10/1882 | Getz | 222/414 X |
| 838,267 | 12/1906 | McWhorter | 239/650 |
| 2,851,199 | 9/1958 | Eriksson | 222/410 X |
| 3,190,506 | 6/1965 | Selzler | 222/414 X |
| 3,229,857 | 1/1966 | Kirschmann | 239/650 |
| 3,355,102 | 11/1967 | Gregory, Jr. | 222/23 X |
| 3,511,411 | 5/1970 | Weiss | 222/626 X |
| 3,606,099 | 9/1971 | Benson | 222/414 X |
| 3,710,220 | 1/1973 | Koch | 318/328 |
| 3,942,114 | 3/1976 | Keeling | 324/177 |

FOREIGN PATENT DOCUMENTS 1936602 1/1970 Fed. Rep. of Germany ...... 324/166

Primary Examiner—Robert B. Reeves
Assistant Examiner—Edward M. Wacyra
Attorney, Agent, or Firm—Shlesinger, Arkwright, Garvey & Dinsmore

[57] ABSTRACT

A granular herbicide or other agricultural chemical is applied using an applicator including a hopper with orifices in its base for discharging the granular material onto metering wheels mounted on a drive shaft beneath the hopper, the wheels feeding the material to a spreader; a motor for driving the shaft to rotate the wheels; and a control circuit which monitors the speed of the motor by constantly monitoring an A.C. feedback from such motor, and controls motor speed by adjusting the current fed to the motor to compensate for speed changes of the motor.

1 Claim, 3 Drawing Figures

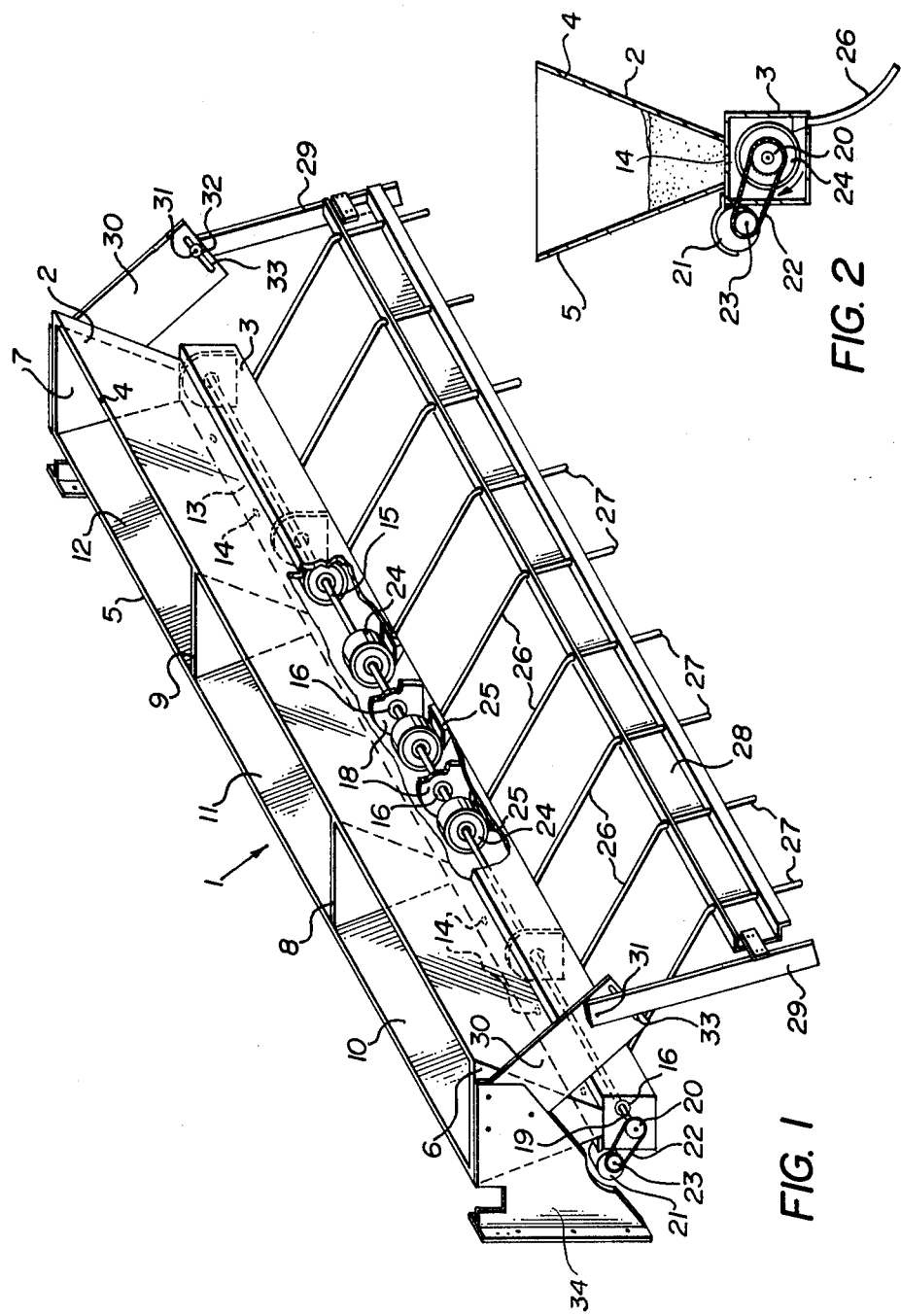

APPLICATOR FOR GRANULAR MATERIAL

This application is a continuation of application Ser. No. 876,252, filed Feb. 9, 1978, and now abandoned.

BACKGROUND AND FIELD OF INVENTION

This invention relates to an applicator for granular material, and in particular to an applicator for granular agricultural chemicals such as herbicides.

The application of some agricultural chemicals, e.g. herbicides must be accurate, with a uniform distribution of the chemicals. This is particularly true of chemicals which are selective in their action. Excessive application in any given area results in the loss of expensive chemicals and may lead to crop loss. Insufficient application obviously results in the loss of treating agent, and the small quantity of chemicals applied may not effect the desired result, e.g. weed control. In many cases it is desirable to apply the treating agent to selected areas of the crop only. Moreover, the applicator must not lose chemicals while in the off condition. This problem arises most often when transporting the applicator from one location to another or when operating on rough terrain. Finally, the rate of application, i.e. output per a given unit of time of the applicator must be easily adjusted, preferably from the tractor or other applicator towing machine. Accordingly, the ideal applicator must supply a constant, uniform and readily adjustable quantity of chemicals, and be readily turned on or off.

Presently available applicators are designed primarily for the application of chemical fertilizer or crop dusts. Most such applicators perform on the basis of a reciprocating or rocking principle, which tends to result in a cyclical output of chemicals rather than a smooth continuous flow. Examples of granular material dispensers are disclosed by Canadian Pat. Nos. 511,023, issued to Sarioni Company, Inc. on Mar. 15, 1955; 569,598 issued to Allis-Chalmers Manufacturing Company on Jan. 27, 1959; 663,435, issued to Sperry Rand Corporation on May 21, 1963; 707,611, issued to D. C. Henderson on May 18, 1965; 723,490, issued to E. I. duPont de Nemours and Company on Dec. 14, 1965 and 949,391, issued to E. A. Seifert on June 18, 1974; and U.S. Pat. Nos. 2,865,536, issued to A. A. Price on Dec. 23, 1958; 3,073,607, issued to D. L. Christy on Jan. 15, 1963; 3,190,506, issued to E. M. Selzler on June 22, 1965; 3,788,529 issued to D. L. Christy on Jan. 29, 1974, and 3,858,759, issued to R. W. Lubenow on Jan. 7, 1975.

Some of the devices disclosed by the above-identified patents rely for feed control on changes in the weight or volume of the material being fed to alter motor speed. The actual feed mechanism may be an auger, apertures closed by slide valves of the type found on small commercially available lawn fertilizers, a feed roller with cavities for receiving and dispensing a quantity of granular material, or brushes extending into a hopper containing the granular material.

In some of the devices, material flows from a top hopper through holes into a smaller bottom hopper forming piles. The tops of the piles are displaced into tubes leading to spreaders by a reciprocating rod extending the length of the lower hopper and studs or washers on the rod. The result is cyclical output. Moreover, on rough terrain, the piles forming in the lower hopper tend to drop out which may cause over application or the wasting of expensive chemicals. Other applicators include trap door type devices extending the entire length of the hopper for rocking back and forth to open one side of the hopper and then the other. Such rocking action results in intermittent output which may be acceptable for chemical fertilizers, but is not acceptable for granular herbicides. Metering devices placed inside the main hopper of the applicator tend to pulverize the granular material, causing compaction within the hopper and reduced feed through the discharge orifices.

Thus, in spite of the large variety of granular feed devices presently available, as exemplified by the art discussed above, there is still a need for an uncomplicated applicator. The object of the present invention is to provide a relatively simple applicator for granular material which is easy to render operative and inoperative, and in which the rate of application can be accurately and quickly controlled.

SUMMARY OF THE INVENTION

Accordingly, the present invention relates to an applicator for granular material comprising a hopper for retaining said material; a plurality of orifices in a base of said hopper for discharging said material from the hopper; a wheel beneath each of said orifices for receiving the material passing through the orifice and feeding the material to a spreader, said wheel being sufficiently close to said orifice to block the orifice when the wheel is stationary; drive means for driving each said wheel at a constant speed; and control circuit means connected to and monitoring said drive means for controlling said drive means to ensure that each said wheel maintains such constant speed.

BRIEF DESCRIPTION OF DRAWINGS

The invention will now be described in greater detail with reference to the accompanying drawings, which illustrate a preferred embodiment of the invention, and wherein:

FIG. 1 is a top perspective view of an applicator in accordance with the present invention;

FIG. 2 is a cross-sectional view of the apparatus of FIG. 1, with parts omitted.

DESCRIPTION OF PREFERRED EMBODIMENTS

Figure 3:
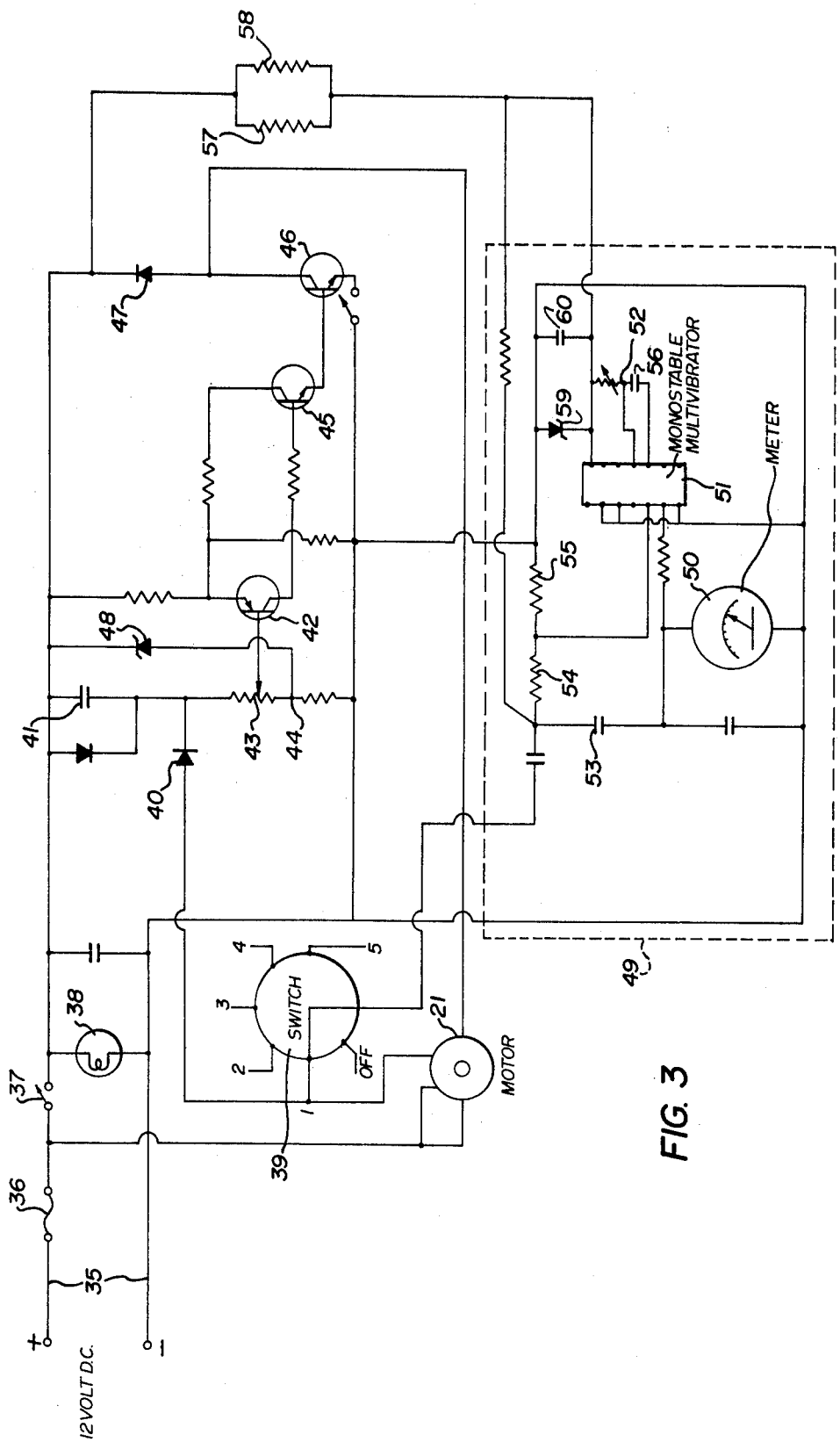
FIG. 3 is a circuit diagram of the control circuit for use with the apparatus of FIG. 1.

Referring to FIG. 1, the applicator of the present invention includes a casing generally indicated at 1 including a top portion in the form of a hopper 2 and a rectangular parallelepipedic bottom portion 3. The hopper 2 includes rectangular front and rear walls 4 and 5, respectively which converge towards the bottom of the hopper, end walls 6 and 7, and partitions 8 and 9, which divide the hopper into compartments 10, 11 and 12. The top of the hopper is open for receiving granular agricultural chemicals, and the bottom of the hopper is closed by a rectangular base 13. The base 13 is provided with a plurality of metering orifices 14 spaced equidistant apart for discharging a predetermined quantity of granular material. Of course, the quantity of material discharged through the orifices 14 during any given interval of time will depend on the size of such orifices.

The bottom portion 3 of the casing 1 contains a shaft 15 rotatably supported in bearings 16. The bearings 16 are mounted in one end wall 17 of the bottom portion 3 and in brackets 18 spaced apart along the width of the casing 1. One end 19 of the shaft 15 extends outwardly beyond the end wall 17 of the bottom portion 3 of the casing 1. A sprocket 20 is mounted on the outer free end 19 of the shaft 15. The sprocket 20 is connected to a small electric motor 21 by a chain 22 and a sprocket 23 mounted on the shaft of the motor. The motor 21 is less than one horsepower, variable speed, ungoverned speed regulated D.C. motor incorporating a small A.C. generator. The purpose of such generator is described in detail hereinafter.

A plurality of metering wheels 24, equal in number to the orifices 14, are mounted on the shaft 15 within the bottom portion 3 of the casing 1. The wheels 24 are spaced the same distance apart as the orifices 14, with the longitudinal axis of a wheel 24 located immediately below one of the orifices 14. The shaft 15 is vertically aligned with the orifices 14, and the spacing between each orifice 14 and the uppermost point on the periphery of its associated metering wheel 24 is such that granular material from the hopper 2 is discharged onto the wheel 24 only when the wheel is rotating with the shaft 15, i.e., when the wheel 24 is stationary it effectively blocks the orifice 14 so that no chemicals can pass therethrough.

During use, any chemical passing through the orifice 14 forms a small pile on the top of the metering wheel 24. The width, diameter and surface roughness of the wheel are such that any small pile of the chemical forming on the top does not tend to spill over the edges or around the circumference. The dimensions of the metering wheels 24 are dependent upon the nature of the chemical being dispensed, the coefficient of friction between the wheel and such chemical, the internal coefficient of friction of the chemical, the diameter of the orifice and the clearance between the wheels 24 and the orifices 14. For any given orifice size and clearance between the orifice and wheel, the output of chemical depends only on the speed of rotation of the wheel 24, i.e. the output of the applicator is dependent only on the speed of the peripheries of the wheels 24.

As the wheels 24 turn (clockwise in FIGS. 1 and 2), the chemical spills into funnels 25, which form the top ends of collector tubes 26. Chemicals are discharged from bottom end 27 of the tubes 26 into a spreader (not shown). In order to permit forward and rearward repositioning of the discharge ends 27 of the tubes 26, such discharge ends are mounted in a cross-bar 28. The ends of the cross-bar 28 are connected to arms 29, which are pivotally mounted on the outer free ends of brackets 30 extending outwardly from the hopper 2. The arms 29 are connected to the brackets 30 by pins 31, and are provided with guide rollers 32 extending into slots 33 in the brackets 30. A bracket 34 is connected on each end of the hopper 2 for mounting the distributor on the frame of a trailer, harrow or other conveying implement.

As mentioned hereinbefore, the speed of rotation of the metering wheels must be variable, so that the rate of application of the agricultural chemical can be varied and it must be possible to maintain such speed constant in order to ensure a uniform, constant supply of chemicals from the hopper 2 to the spreader. The circuit for effecting such motor control includes the A.C. generator (not shown) in the motor 21. The generator produces signals which are fed to a control panel located in the tractor or other towing vehicle. The A.C. signal feedback is the basis for controlling the speed of the motor 21, and consequently the speed of rotation of the rollers 24. The motor 21 is powered by the electrical system of the towing vehicle. Once a speed has been selected the control circuit of FIG. 3 monitors the speed and compensates for changes in such speed. The control circuit also compensates for minor variations in torque as a result of bearing misalignment and the like. Thus, the speed of rotation of the metering wheels 24 is maintained constant.

In general terms, the speed of the motor 21 is accurately controlled by a circuit which utilizes the A.C. output of the motor to produce a D.C. voltage which is dependent upon motor speed. The D.C. voltage level in turn controls the potential and thus the current delivered to the motor, and consequently maintains a constant motor speed under a variety of conditions.

The motor 21 is powered by a power source (e.g. the battery of the tractor towing the applicator) via leads 35 incorporating a fuse 36, an on-off switch 37 and an indicator light 38. At any control setting of a switch 39, the A.C. output (feedback) from the motor 21 is rectified by rectifier 40 to provide a D.C. voltage level with respect to the 12 volt line across capacitor 41. A net D.C. voltage level is provided at the base of a transistor 42 dependent upon the frequency of the tach generator output (feedback from the motor 21) and the setting of a speed control potentiometer 43. As the setting of the potentiometer 43 moves towards point 44, the transistor 42 is turned on harder, i.e. the current flow through the transistor increases providing a greater flow through transistors 45 and 46 to increase the current to the motor 21. In the same manner, an increase in the load on the motor 21 causes an initial decrease in motor speed and a resultant drop in potential at the base of the transistor 42. Again, the transistor 42 conducts more heavily providing a greater current to transistors 45 and 46, whereby the motor torque is increased to compensate for the increased load. A rectifier 47 is provided in the control circuit to protect the transistor 46 from excessive transients (voltage variations).

The circuit described above is particularly suited to the present invention, because full potential is applied to the motor 21 initially, resulting in a rapid transition to steady state speed. As the speed of the motor 21 increases and the voltage level across capacitor 41 increases, current flow through the transistor 42 decreases to provide a smooth adjustment to the desired operating speed of the motor. A zener diode 48 protects the transistor 42 from excessive current loads by maintaining a potential of approximately 6.5 volts at the point 44. When there is no input from the A.C. generator of the motor 21, e.g. when the motor stalls, the maximum current fed to the motor is 2 amps, at which time the current flow through the transistor 42 is limited by the Zener diode 48.

The drive circuit described above is coupled to a metering circuit 49, which includes meter 50 for providing an indication of motor speed. The meter is connected to a monostable multivibrator chip 51, which provides a D.C. metering current dependent upon the frequency of the signal from the A.C. generator of the motor 21. The meter 50 measures the metering current, which is porportional to the motor speed. A readout calibration is provided via a variable resistor 52 as it, in conjunction with capacitor 56, changes the duration of the output pulse from the chip 51. The switch 39 permits switching so that the desired output of the A.C. generator of the motor 21, i.e. motor speed can be monitored. A capacitor 53 provides a ground path for high frequency potentials essentially isolating the trigger input from false signalling. Since the A.C. generator of the motor 21 provides a 6 volt A.C. potential, resistors 54 and 55 voltage divide the input from the generator to a level which can be safely handled by the chip 51 and still provide reliable triggering.

Resistors 57 and 58 create a voltage drop from the supply to provide a voltage acceptable to the metering circuit 49. Zener diode 59 protects chip 51 by maintaining a constant potential of approximately 5.1 volts from the supply. Capacitor 60 provides added filtering of unwanted frequency signals, thus the speed of the motor 21 and consequently the speed of rotation of the wheels 24 is constantly monitored and, if necessary, adjusted. With this arrangement, at any given setting of the switch 39, the motor 21 will operate at a constant speed to ensure accurate and uniform dispensing of granular herbicide by the rollers 24.

It will be appreciated that a control box will be provided in the tractor or other towing vehicle. The control box will contain one metering circuit 49 and from three to five drive circuits for varying the current to the motor 21 in accordance with the setting of the switch 39.

What is claimed is:

1. An applicator to be used on a vehicle for metering and discharging granular agricultural material, comprising:
    a hopper for holding the granular material, said hopper having a base containing a plurality of orifices therein whereby the granular material may fall through each of said orifices by the action of gravity, said plurality of orifices being disposed in a line;
    a rotatable shaft positioned below said orifices parallel to the line of said orifices in the vertical plane defined by said orifices;
    a plurality of metering wheels mounted on said shaft for rotation with said shaft in planes perpendicular to the axis of rotation of said shaft, each said wheel being vertically aligned with one of said orifices with the center of said wheel coinciding with the axis of rotation of said shaft whereby the uppermost point on the periphery of each said wheel is vertically aligned with one of said orifices;
    the uppermost point on the periphery of each said wheel forming a predetermined clearance with its orifice so that, given the dimensions and surface roughness of said wheels, the size of each said orifice, and the characteristics of the granular material, the granular material is discharged from between said hopper base and the periphery of each said wheel only when each said wheel is rotating and the rate of discharge depends only on the speed of rotation of said shaft and said wheels whereby the output of granular material is a linear function of the speed of rotation of said shaft and said wheels;
    a downwardly disposed collector tube positioned below each said wheel for receiving the granular material discharged from between said hopper base and said wheel and for conducting the granular material to a spreader means, each said collector tube having a funnel forming the top end of said tube into which the granular material spills and a discharge end;
    a motor for rotating said shaft and said wheels;
    means for setting the speed of said motor and thereby the speed of rotation of said shaft and said wheels;
    electric control means for automatically regulating said motor to maintain said shaft and said wheels at the set speed, said control means including means for constantly monitoring the speed of said motor and adjustment means for varying the electric input to said motor in accordance with the signals received from said monitoring means; and,
    means for forward and rearward positioning of said discharge ends of said collector tubes, said collector tube positioning means comprising a horizontally disposed cross bar connected to said collector tubes adjacent said discharge ends and means cooperating with said cross bar for pivoting said cross bar and thereby said discharge ends of said collector tubes with respect to said hopper.

* * * * *